United States Patent [19]
Filby

[11] 4,098,691
[45] Jul. 4, 1978

[54] PURIFICATION OF WATER FOR BOILER

[75] Inventor: John Filby, Edmonton, Canada

[73] Assignees: Her Majesty the Queen in right of Canada, as represented by the Minister of Energy, Mines and Resources, Ottawa; Her Majesty the Queen in right of the Province of Alberta, Government of the Province of Alberta, Department of Energy and Natural Resources, Alberta Syncrude Equity, Edmonton; Ontario Energy Corporation, Toronto; Imperial Oil Limited, Toronto; Canada-Cities Service, Ltd., Calgary; Gulf Oil Canada Limited, Toronto, all of Canada

[21] Appl. No.: 767,438

[22] Filed: Feb. 10, 1977

[51] Int. Cl.$^2$ .......................... C02B 1/38; C02B 1/60
[52] U.S. Cl. .................................. 210/29; 210/30 R; 210/37 R; 210/40; 210/63 Z
[58] Field of Search .................. 210/24, 29, 30 R, 32, 210/37 R, 63 Z, 40, 73 R

[56] References Cited

U.S. PATENT DOCUMENTS

| 897,039 | 8/1908 | Vogelsang | 210/63 Z |
| 1,341,913 | 6/1920 | Leggett | 210/63 Z |
| 2,669,713 | 2/1954 | Osmun | 210/37 R |
| 3,635,817 | 1/1972 | Zuckerman et al. | 210/40 |

OTHER PUBLICATIONS

Kunin, R., *Ion Exchange Resins*, N.Y., R. E. Krieger, 1972, pp. 382–383.

*Primary Examiner*—Thomas G. Wyse
*Assistant Examiner*—Ivars Cintins
*Attorney, Agent, or Firm*—E. Peter Johnson

[57] ABSTRACT

Ozone is dispersed in river water to be purified and used in a high pressure boiler. The ozone selectively degrades large organic molecules, dissolved in the water, which ordinarily will irreversibly foul the strongly basic anion attracting resin used to adsorb silicious contaminants from the water. The degraded molecules are reduced in resin-fouling capability and are removed from the resin during regeneration.

4 Claims, 2 Drawing Figures

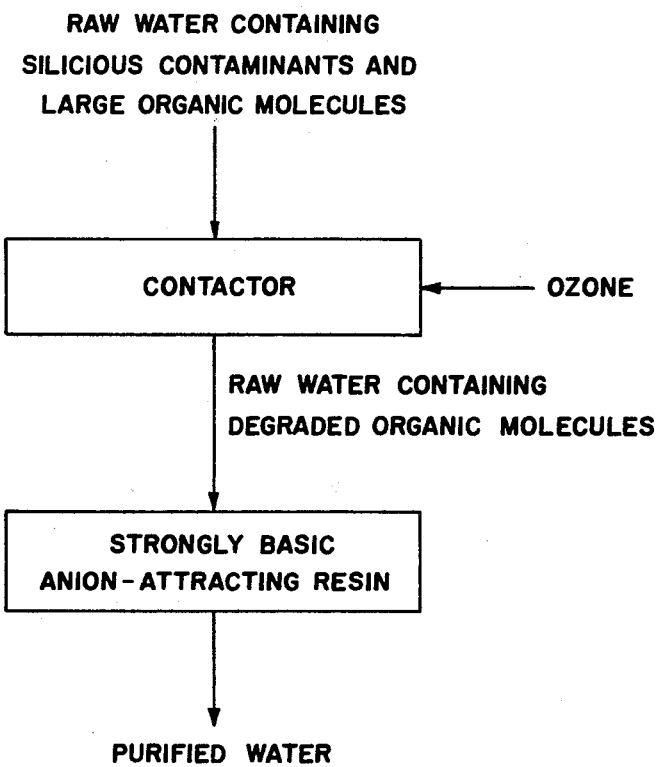

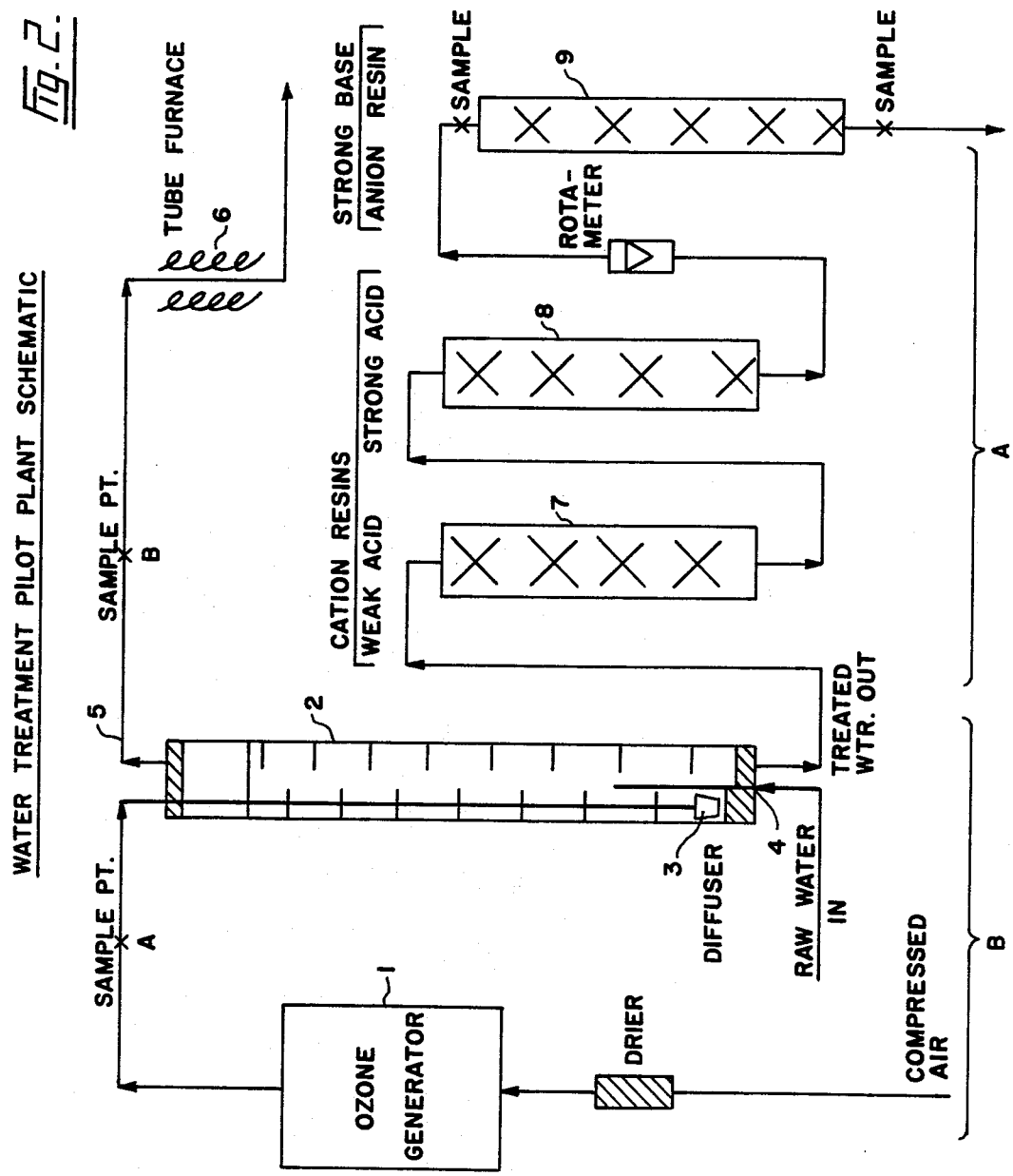

PURIFICATION OF WATER FOR BOILER

BACKGROUND OF THE INVENTION

This invention relates to a process for purifying raw water, containing dissolved organic molecules of high molecular weight and silicious contaminants, to render it suitable for use as boiler feed.

In purifying raw water, such as river or lake water, special consideration must be given to the removal of silica in its various forms. Usually the silica is dissolved to some extent and is present in the water as silicic acids. When the untreated raw water is introduced into a boiler, the silicic acids tend to be converted to silica, which forms a solid deposit on the boiler surfaces. This deposit detrimentally interferes with heat transfer within the boiler.

In modern high pressure boilers, which operate at elevated water temperatures, silica and its related compounds (collectively termed ' silicious contaminants') pose a further problem. Several silicious contaminants are volatile at the temperatures at which high pressure boilers operate and can be carried in the evolving steam, to be deposited in solid form on equipment and pipes through which the steam passes.

It is a well-established feature of boiler operating art that silicious contaminants in boiler feed water may be conveniently removed by contacting the water with a strongly basic anion-attracting exchange resin. The silicious contaminants are adsorbed by the resin.

Before the raw water is contacted with resin, such water is usually treated to remove most of the minerals ("softening") and insoluble organic materials ("clarifying"). This pre-treatment is done by contacting the raw water with certain chemicals, commonly one or more of: lime, alum, carbon, sodium aluminate, and clay. The treatment is done before the water contacts the resin, as the minerals and organic substances themselves tend to be adsorbed onto the resin with the consequence that the resin will rapidly foul and will need regeneration. Regeneration usually involves contacting the resin with a base, such as sodium hydroxide.

A further step in the pre-treatment is contacting the raw water with chlorine to kill obnoxious bacteria.

The combination of traditional pre-treatment and contact with resin has been effective in purifying most types of water used as boiler feed. However, a problem arises when the raw water, besides containing silicious contaminants, also contains significant quantities of large dissolved organic molecules, which is the case when the water originates from regions where drainage areas are swampy. These organic molecules are thought to be humic acid or analogues thereof. In any event, the organic molecules are substantially unaffected by the conventional pre-treatment process; instead, they are adsorbed by the resin and foul it. When the resin is regenerated, these organic molecules are only partly removed by the first regeneration and less completely with subsequent regenerations, with the resin rapidly being rendered useless.

A probable reason for the organic molecules' affinity for the resin is that such resins are manufactured with a high pore volume at the surface to encourage ion exchange; it is believed that this porous structure offers sites where the large organic molecules can adhere to the resin.

Two known methods have been heretofore available for removing the offending water-soluble organic molecules. The first method involves contacting the raw water with adsorbant activated charcoal. However, this method is impractical for large flows. The second method involves contacting the raw water with a weakly-basic anion attracting resin. This resin extracts substantially all organic molecules from the water, after which silicious contaminants may be removed in the usual way with a strongly basic resin. The guard resin may be periodically regenerated, but its use is characterized by: high capital cost, frequent regeneration, and frequent testing to monitor the effectiveness of the guard resin.

SUMMARY OF THE INVENTION

In accordance with the present invention, raw water containing silicious contaminants and high molecular weight water-soluble organic molecules, the latter usually having a molecular weight of 6,000 or greater, is contacted with ozone, before the water is contacted with the strongly-basic anion attracting resin. The ozone is dispersed in the water in sufficient quantity as to degrade larger organic molecules, with the result that the resin may satisfactorily be regenerated in conventional manner, as by contacting it with sodium hydroxide. Preferably the ozone is provided in an amount less than 2 parts per million by weight/per part per million by weight carbon present in the water as total organic carbon.

The invention is characterized by several advantages. Firstly, it appears that the ozone is selective in degrading the large organic molecules without significantly attacking the degradation products — thus the invention can be practised without a high consumption of ozone. Secondly, the ozonized organic molecules are significantly less intense in their resin-fouling properties, thereby making it possible to use the resins longer before regeneration is needed. Thirdly, because ozone is a powerful oxidizing agent, the need for chlorine pre-treatment is reduced or eliminated, thereby simplifying the water treatment operations. Finally, the process is relatively simple and inexpensive and does not require careful monitoring.

DESCRIPTION OF THE DRAWINGS

In the drawings FIG. 1 is a block diagram illustrating the sequence of steps for a preferred form of the invention; and FIG. 2 is a diagrammatic illustration of the invention as practised on the pilot run.

DESCRIPTION OF THE PREFERRED EMBODIMENT

The pilot circuit A shown in FIG. 2 had been fed raw water taken from the Athabasca River in Alberta. The drainage area for this river is characterized by large areas of swamp (known locally as "muskeg") and the water was contaminated with appreciable quantities of mildy acidic organic material — it contained 10 — 30 ppm as total organic carbon (TOC). It was found that, without ozonation, the strongly basic resin would foul and become inoperative with 12 hours of operation. The resin was considered exhausted when a sudden rise was noted of the conductivity of the emerging water in conjuction with a drop in pH. The resin was regenerated once and operated satisfactorily, however within 12 hours it was exhausted and, when contacted with regenerating base, was ineffective for ion exchange.

The invention was then practised as follows. A laboratory plate-type ozonator 1 (Grace* model, LG-2-L1, capacity 100 grams ozone per day) was used to disperse ozone into a contact column 2 having a diameter of 7 cm. and height of 200 cm. The ozone produced by the ozonator 1 was introduced into column 2 through a porous glass diffuser 3 placed at the raw water intake 4. Excess ozone was removed from the column 2 through an overhead line 5 and decomposed in a tube furnace 6 packed with quartz chips and maintained at 1000° C. The ozonated water was then passed through the conventional water treatment circuit A comprising a weak acid cation-attracting resin column 7, a strong acid cation-attracting resin column 8 and the strong base anion-attracting resin column 9. Athabasca River water, which had been held in a storage tank, was fed to the column 2 at the same rate as had been the case before the ozonator circuit B had been installed, i.e. 200 cm$^3$/minute. This water contained 30 ppm TOC. The test was carried out for a period of 6 days, with the strongly-basic resin being regenerated daily without noticeable decrease in its efficiency.

A particular advantage of the invention is that only enough ozone has to be added to the feed water to degrade the large molecules, without the need for organic molecules to be oxidized all the way to carbon dioxide. This was demonstrated by analysis. On treating raw water with from 5 to 6 ppm ozone the total organic carbon (TOC) was reduced from fifteen ppm to fourteen ppm. Analysis of duplicate samples by the ultraviolet technique (UV) at 225nm, however, showed that UV absorption in the ozone treated water was only about half the level of the untreated water. Since small molecules absorb less than larger molecules the diminished UV absorbance after ozone treatment is an indication of degration of the humic and fulvic acids. On the other hand the only slight diminution in TOC reveals that very little of the organic material was vapourized to carbon dioxide. The selectivity whereby ozone preferentially degrades the larger organic molecules ensures that the invention is highly efficient in the use of ozone.

What is claimed is:

1. In the process in which raw water, containing silicious contaminants and dissolved organic molecules having a molecular weight in excess of 6000, is treated with strongly basic anion-attracting exchange resin to remove substantially all said silicious contaminants to prepare said water for use as boiler feed, said resin being subjected to periodic regeneration when its ion exchange capacity is reduced by use, the improvement which comprises:

dispersing ozone in said raw water, before the water is contacted with the strongly basic resin, said ozone being added in sufficient quantity as to degrade the organic molecules to species of lower molecular weight whereby the resulting degraded organic molecules after adsorption on said strongly basic resin may be removed by regeneration with a strong base.

2. Process according to claim 1 comprising:

contacting, used, ineffective resin, previously contacted by ozonated water, with a regenerating solution of strongly basic, water soluble substance, thereby converting said resin to an effective reusable condition.

3. Process according to claim 2 comprising:

contacting the resin with purified water to wash out residual amounts of said strongly basic water soluble substance to prepare said resin for further use in removal of silicious contaminants from raw water.

4. Process according to claim 1 wherein:

the quantity of ozone used is not more than 2 parts per million by weight for every part per million by weight of carbon present in said raw water as total organic carbon.

* * * * *